United States Patent
Jacob

Patent Number: 6,089,984
Date of Patent: Jul. 18, 2000

[54] CONSTANT VELOCITY FIXED JOINT WITH CONTROL ELEMENT

[75] Inventor: Werner Jacob, Frankfurt, Germany

[73] Assignee: GKN Löbro GmbH, Offenbach/Main, Germany

[21] Appl. No.: 09/215,108

[22] Filed: Dec. 18, 1998

[30] Foreign Application Priority Data

Dec. 19, 1997 [DE] Germany ............................ 197 56 513

[51] Int. Cl.$^7$ ........................................................ F16D 3/16
[52] U.S. Cl. ............................ 464/145; 464/906; 464/15; 464/141
[58] Field of Search ..................... 464/7, 15, 139, 464/141, 906, 142, 145, 904

[56] References Cited

U.S. PATENT DOCUMENTS

| | | | |
|---|---|---|---|
| 2,781,617 | 2/1957 | Lines | 464/139 |
| 2,875,599 | 3/1959 | Gregory | 464/15 |
| 4,623,321 | 11/1986 | Orain | 464/7 |
| 5,376,052 | 12/1994 | Jacob et al. | |
| 5,647,801 | 7/1997 | Jacob | |
| 5,762,559 | 6/1998 | Jacob et al. | 464/145 |

*Primary Examiner*—Terry Lee Melius
*Assistant Examiner*—Kenneth Thompson

[57] ABSTRACT

The invention relates to a constant velocity fixed joint having an outer part 1 carrying a supporting element 9. An inner part 11 has a hollow spherical control face 17. A cage 18 is guided on the inner part 11 and holds balls 21 which, transmit torque between the inner part 11 and the outer part 1 by engaging outer running grooves 5 in the outer part 1 and inner running grooves 14 in the inner part 11. A control element 22 has a spherical contact face 23 which supports the inner part 11 in that the latter is supported on the contact face 23 by means of the control face 17. Furthermore, the control element 22 is supported by a holding face 25 against a supporting face 10 of the supporting element 9 for the purpose of centering the inner part 11 along the longitudinal axis 2 of the outer part on the joint articulation center 0. To reduce the sliding friction between the control face 17 and the contact face 23, the cavity 26 is filled with lubricant and supplies the faces sliding on one another with lubricant through apertures 28 which end in lubricating grooves 27.

3 Claims, 1 Drawing Sheet

CONSTANT VELOCITY FIXED JOINT WITH CONTROL ELEMENT

BACKGROUND OF THE INVENTION

The invention relates to a constant velocity fixed joint having a hollow outer part. Outer running grooves are circumferentially distributed in meridian planes around the longitudinal axis of an inner circumference of the outer part. Furthermore, the outer part is provided with first connecting means which serve to be connected, for example, to a driving or driven component. Such connecting means can be provided in the form of a flange or plug-in journal, for instance. Furthermore, a supporting face is provided which is stationary relative to the outer part, with the longitudinal axis of the outer part being positioned perpendicularly on said supporting face. The supporting face is preferably associated with the connecting means which are firmly connected to the outer part.

Furthermore, the constant velocity fixed joint comprises an inner part which, on its outer face, comprises inner running grooves which, in accordance with the outer running grooves, are circumferentially distributed in meridian planes around the longitudinal axis of the inner part. The inner part is provided with a control face which is open towards one end and which is at least partially shaped like the face of a hollow sphere. The constant velocity fixed joint also comprises a cage arranged between the outer part and the inner part, which, by means of a face shaped like the face of a hollow sphere, is guided on a guiding face and which is provided with windows which are distributed in accordance with the outer running grooves and the inner running grooves and which are open towards same. Balls are accommodated in the windows of the cage. The balls engage the outer running grooves and inner running grooves which, together, form a pair, and the balls also radially center the inner part relative to the outer part. There is also provided a control element which comprises a contact face which is designed to form part of a ball and which is contacted by the control face of the inner part. Furthermore, the control face is provided with a holding face by means of which it is supported against the supporting face, and centers the inner part along the longitudinal axis of the outer part relative to the outer part.

Such a constant velocity fixed joint is described in greater detail in U.S. Pat. No. 5,376,052 for example, wherein there is provided a control element in the form of a hollow formed plate metal part. The control element comprises a portion shaped like a ball and which is followed by a holding portion whose cross-section is reduced relative to the spherical portion and which is widened conically towards a collar. On its outside, the portion shaped like a hollow sphere is provided with a shape by means of which it is in planar contact with the hollow spherical face of the inner part. Furthermore, there is provided a central aperture towards the inner part.

It is the object of the invention to further develop the constant velocity fixed joint of said species in such a way that the production of the control element is simplified and that the sliding conditions between the control element and the inner part are improved.

SUMMARY OF THE INVENTION

The objective for a constant velocity fixed joint of this species is achieved in that the control element is provided in the form of a hollow formed part and comprises a collar which, in turn, comprises the holding face. The cavity of the control element is undercut-free from the collar and serves as a lubricant reservoir. The contact face of the control element is provided with lubricating grooves. Apertures are provided between the cavity and the contact face, and positioned in the region of the lubricating grooves.

The advantage of this embodiment is that by ensuring an adequate supply of lubricant to those faces of the inner part and outer part which slide on one another, it is possible to guarantee a long service life. As a result of the lubricating grooves and the high sliding speed existing between the control face of the inner part and the contact face of the control element during the rotation and articulation of the constant velocity fixed joint, it is possible, at least approximately, to achieve a hydro-dynamic type of lubrication. The latter is advantageously affected by the high sliding speeds. Furthermore, the undercut-free control element is easy to manufacture. Required manufacturing tools are cheap to produce. In a preferred embodiment, the control element is formed of plate metal and has a substantially hat-shaped cross-section.

A preferred embodiment of the invention is diagrammatically illustrated in the drawing.

DETAILED DESCRIPTION

Constant velocity fixed joints in accordance with the invention are preferably used in a driveline for driving the wheels of a motor vehicle.

Figure 1:
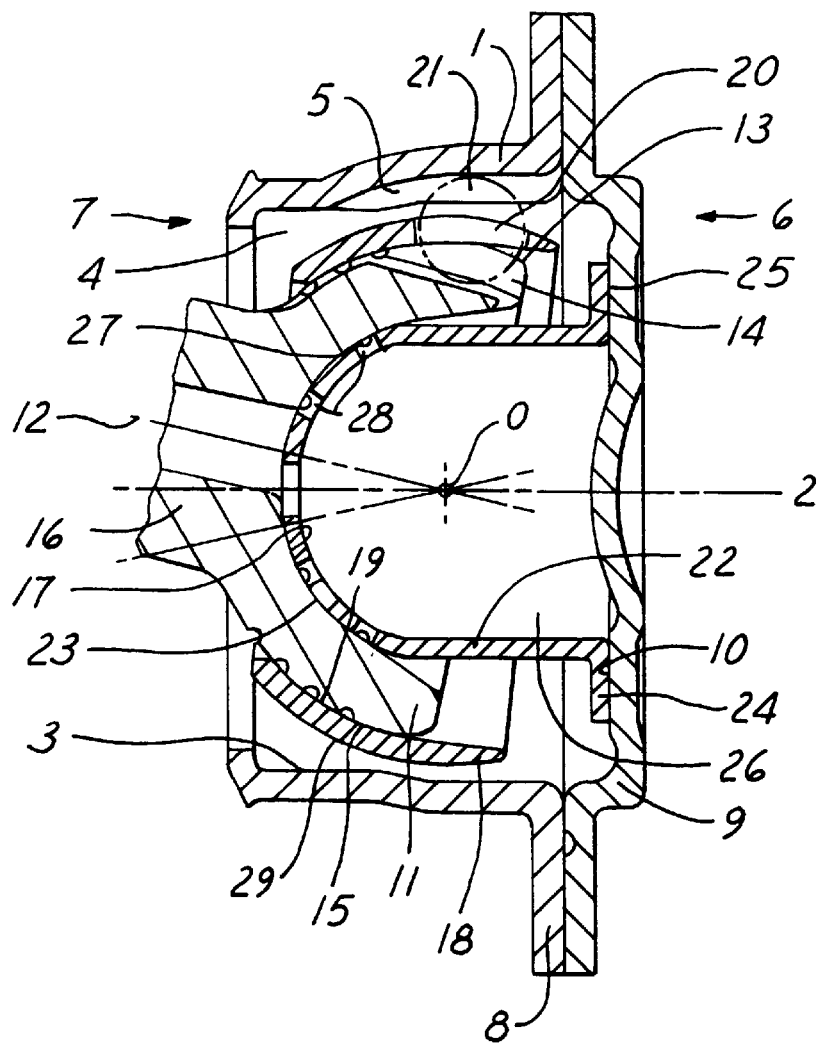
FIG. 1 shows a longitudinal section of a CV fixed joint in accordance with the invention, with the inner part being articulated relative to the outer part.

The constant velocity fixed joint as shown in FIG. 1 comprises an outer part 1 with the longitudinal outer part axis 2. On the inner circumference 3 of the outer part 1 there are arranged circumferentially distributed outer running grooves 5. Grooves 5 start from a first end 6 and extend in an undercut-free way in meridian planes, i.e. the track base of the outer running grooves 5 as progressing from the first end 6 of the outer part 1 along the longitudinal outer part axis 2 towards the second end 7 remains at the same distance from the longitudinal outer part axis 2 or approaches same. The outer part 1 is preferably produced in a non-chip forming way by being forced from plate metal. By forming in the outer running grooves 5, there is obtained a kind of corrugated structure on the outer circumference. Towards its first end 6, the outer part 1 is provided with a flange 8 which extends outwardly with reference to the longitudinal outer part axis 2 and to which there is connected a supporting element 9. The two parts can be connected by riveting or welding for example. For this purpose, the supporting element 9 is provided with a portion which has to be made to overlap with the flange 8. Furthermore, the supporting element 9, on its inside, is provided with a planar supporting face 10 which is annular in shape and on which the longitudinal outer part axis 2 is positioned perpendicularly. As a result of the connection between the supporting element 9 and the outer part 1, the supporting face 10 is stationary relative to the outer part 1. The inner part 11 is arranged in the cavity 4 of the outer part 1 so as to be pivotable in all directions. The inner part 11 has a longitudinal inner part axis 12. In the outer face 13 of the inner part there are arranged inner running grooves 14 which are circumferentially distributed around the longitudinal inner part axis 12 and extend in meridian planes. In respect of number and distribution around the longitudinal inner part axis 12, the inner running grooves 14 correspond to the outer running grooves 5 in the outer part 1. The inner running grooves 14 also extend from the first end 6 in an undercut-free way, i.e. the track base extends from the first end 6 along the longitudinal inner part axis 12 towards the end 7 at an increasing distance from the longitudinal axis 12 or, in parts, at a uniform distance. Furthermore, the inner part 11 is provided with a formed-on shaft 16 of which only part is illustrated and which serves to establish a connection with a tubular shaft or the like for example. Towards the shaft 16, the inner part 12, on its outer face, is provided with a spherical guiding face 15. In addition, the inner part 12 comprises a recess with a hollow spherical contact face 17, which recess opens towards the first end 6. The centers of the radii of the hollow spherical control face 17 and of the spherical guiding face 15 are centered on the joint articulation center 0.

Between the inner part 12 and the outer part 1 there is arranged a cage 18. The cage 18 is dish-shaped and open at both axial ends. Cage 18 comprises a hollow spherical face 19 by means of which it is guided on the spherical guiding face 15 of the inner part 12. Furthermore, it comprises circumferentially distributed windows 20 which are arranged so as to be circumferentially distributed in accordance with the opposed inner running grooves 14 and outer running grooves 5 and which are open towards same. The outer face 29 of the cage 18 is arranged at a distance from the inner circumference 3 of the outer part 1. The unit consisting of the inner part 11 and the cage 18 is held and centered in the outer part 1 by the balls 21 which are received and guided in the windows 20 of the cage 18 and which engage opposed outer running grooves 5 and inner running grooves 14 for the purpose of transmitting torque. As a result of the above-described course taken by the outer running grooves 5 and inner running grooves 14, the balls 21, when transmitting torque, generate a force which acts on the cage 18 and holds same by means of the hollow spherical face 19 of same in contact with the guiding face 15 of the inner part 11 and radially centers both parts relative to the outer part 1.

Figure 2:
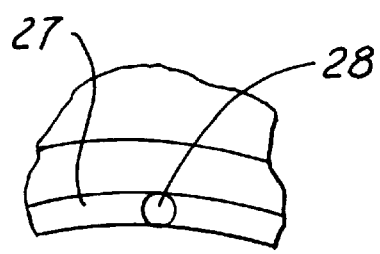
FIG. 2 is an enlarged view of a portion of the inventive joint.

Furthermore, there is provided a control element 22 which is substantially hat-shaped. It comprises a spherical contact face 23 and a collar 24 with a planar holding face 25. The control element 22 is formed of plate metal, and has a cavity 26 which starts from the collar 24 and extends in an undercut-free way. In the spherical contact face 23 of the control element 22, there are distributed lubricating grooves 27. Between the lubricating grooves 27 and the cavity 26 there are provided apertures 28, see FIG. 2. The cavity 26 is filled with a lubricant, i.e. it serves as a lubricant reservoir and for transferring the lubricant through the apertures 28 into the lubricating grooves 27. In the radial direction with reference to the longitudinal outer part axis 2, the control element 22, by means of its holding face 25, is radially movable supported on the supporting face 10 of the supporting element 9 which is firmly connected to the outer part 1. By means of its control face 17 which is of hollow spherical shape and runs out in a conically widened form towards the first end 6, the inner part 11 is supported against the spherical contact face 23 of the control element 22. In this way, the inner part 11 is held and centered relative to the outer part 1 along the longitudinal outer part axis 2 on the joint articulation center 0. Those faces of the inner part 11 and the control element 22 which slide on one another, i.e. the control face 17 and the contact face 23, are supplied with lubricant from the cavity 26 through the apertures 28 and the lubricating grooves 27 to achieve, at least approximately, a hydro-dynamic type of lubrication. The hollow spherical portion with the contact face 23 of the control element 22 is followed by a substantially cylindrical portion which ends on the collar 24.

Although a preferred embodiment has been disclosed, a worker in this art would recognize that modifications come within the scope of this invention.

What is claimed is:

1. A constant velocity fixed joint comprising:

a hollow outer part having outer running grooves which are circumferentially distributed in meridian planes around the longitudinal axis of the outer part, and at an inner circumference;

first connecting means is associated with a supporting face which is stationary relative to said outer part and on which said longitudinal axis of said outer part is positioned perpendicularly;

an inner part having inner running grooves on an outer face which, in accordance with said outer running grooves are circumferentially distributed in meridian planes around an longitudinal axis of said inner part, and which is provided with a control face which is open towards one end and which is at least partially shaped like the face of a hollow sphere;

a cage arranged between said outer part and said inner part, which, by means of a face shaped like the face of a hollow sphere, is guided on a guiding face of said inner part and which is provided with windows distributed in accordance with said outer running grooves and said inner running grooves and which are open towards same;

a ball accommodated in each window and which each engage one of said outer running grooves and said inner running grooves which, together, form a pair, and which radially center said inner part relative to said outer part; and a control element having a contact face designed to form part of a ball and which is contacted by said control face of said inner part, said control element provided with a holding face by means of which it is supported against said supporting face, and which centers said inner part along said longitudinal axis of said outer part relative to said outer part, with said control element being provided in the form of a hollow formed part and having a collar which, in turn, comprises said holding face, and furthermore, with a cavity of said control element being undercut-free from said collar and serving as a lubricant reservoir, and with said contact face of said control element being provided with lubricating grooves and with apertures being provided between said cavity and said contact face, said apertures are positioned in the region of said lubricating grooves.

2. A constant velocity joint according to claim 1, wherein the control element is formed of plate metal and has a hat-shaped cross-section.

3. A constant velocity joint according to claim 1, wherein said apertures communicate lubricant between said cavity and said grooves.

* * * * *